Jan. 25, 1938. F. E. TALTY Re. 20,641

FLUOROSCOPIC DEVICE

Original Filed Nov. 17, 1931 2 Sheets-Sheet 1

Inventor
FRANCIS E. TALTY

By Semmes & Semmes
Attorneys

Jan. 25, 1938. F. E. TALTY Re. 20,641

FLUOROSCOPIC DEVICE

Original Filed Nov. 17, 1931 2 Sheets-Sheet 2

Inventor

FRANCIS E TALTY

By Semmes & Semmes

Attorneys

Reissued Jan. 25, 1938

Re. 20,641

UNITED STATES PATENT OFFICE 20,641

FLUOROSCOPIC DEVICE

Francis E. Talty, Arlington, Mass., assignor to Daylight Fluoroscope Corporation, Cambridge, Mass., a corporation of Massachusetts Original No. 1,967,980, dated July 24, 1934, Serial No. 575,608, November 17, 1931. Application for reissue September 21, 1934, Serial No. 744,992

7 Claims. (Cl. 250—34)

This invention relates in general to fluoroscopic devices and more particularly to a device of this character adapted to be used in a well lighted room.

Fluoroscopic devices are used extensively by the medical profession to determine visually without the use of an X-ray film, the condition of a certain part of a person's body. Prior to this time, however, it has been necessary to use the device in an absolutely dark room to permit the operator to see the image reproduced on the fluorescent screen.

The operation of the device in a dark room obviously has many disadvantages. It is dangerous to the operator in that, due to the absolute darkness, the possibility of accidental contact with the high tension wires associated with the device is great. This is especially true in view of the necessity of the operator moving around. Children and persons of nervous nature experience considerable fear in an absolutely dark room, especially when there for medical treatment. Obviously, such fear should be eliminated. In addition, it is necessary to administer medication for particular types of fluoroscopical work, and in a dark room this is quite difficult and at times almost unsurmountable.

An object of my invention is to overcome the above and other disadvantages of the prior art.

Another object of my invention is to provide a fluoroscopical device adapted to be used in a well lighted room.

Still another object of my invention is to provide a fluoroscopical device perfectly screened from the operator.

A further object of my invention is to provide a fluoroscopical device having a separate dark chamber.

A still further object of my invention is to provide means within the dark chamber for reproducing an image.

Yet another object of my invention is to provide a fluoroscopical device adapted to be moved over a certain area.

Another object of my invention is to provide a fluoroscopical device having means to protect the operator from X-rays.

Still another object of my invention is to provide a fluoroscopical device in which the X-ray tube is above the dark chamber.

Yet a further object of my invention is to provide a fluoroscopical device in which the X-ray device moves in unison with the dark chamber.

With these and other objects in view which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

This invention broadly comprehends providing a fluoroscopical device adapted to be used in a well lighted room. The X-ray apparatus is positioned above the dark chamber and both are adapted to move together so as to subject any part of a patient lying on the table to the action of the fluoroscopical device. Associated with one end of the dark chamber is a window permitting the operator to view the image formed on a fluorescent screen in the top of the dark chamber by means of a mirror positioned within the dark chamber. A panel extends above the dark chamber and has a means to view a patient on the table and additional means for allowing the operator to manipulate the X-ray proof curtains for regulating the area to be covered by the X-rays. Other features of the invention will hereinafter appear.

In order to make my invention more clearly understood, I have shown, in the accompanying drawings, means for carrying the same into practical effect without limiting the improvements in their useful applications to the particular constructions which, for the purpose of explanation, have been made the subject of illustration.

Figure 1:
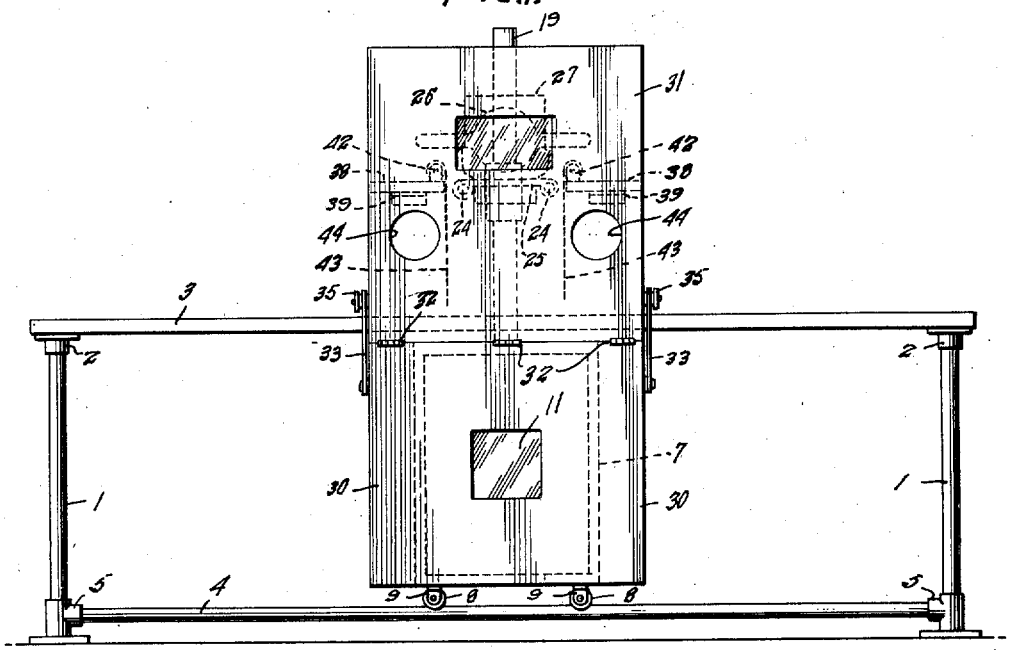
Figure 1 is a view showing the back of the fluoroscopical device.

Referring to the drawings, wherein similar parts are represented by like symbols throughout and more particularly to Figure 1, there is shown a plurality of uprights 1 provided with members 2 having flattened heads suitably secured to the uprights. A top 3 is adapted to rest upon and be secured to the flattened heads of the members 2 by any suitable means. The top 3 may be of any suitable material, such as wood or metal, and may be provided with cushions, not shown, to present a softer surface. As is clearly shown, the uprights 1 and top 3 form a conventional table upon which a patient is placed while undergoing treatment. The table so formed should be of sufficient length to receive the entire body of a patient, so that it will not be necessary to change the position of the body to subject any part thereof to the action of the device. A rod 4 extending parallel to each of the sides of the top 3 is suitably secured by means of joints 5 to the uprights 1. Transverse rods 6 are provided to render additional support to the table and are joined to each of the uprights 1 by the joints 5.

While I have shown and described a particular type of table for use with my fluoroscopical device, it is to be clearly understood that other forms of tables permitting both longitudinal and transverse movement of the apparatus to be hereinafter described, may be used.

A dark chamber 7 is adapted to travel on the rods 4, which act as tracks therefor, by means of a plurality of rollers 8 secured to the chamber 7 by means of supports 9. As is clearly shown, the supports 9 form bearing members for the rollers. If desired, additional rollers or any other suitable means may be provided in order to permit transverse movement of the dark chamber 7. The additional rollers would coact with transverse tracks or a solid member between the rods 4 in order to be easily moved. The chamber 7 is constructed of any suitable material, and in such a manner as to exclude light from the interior thereof. A lining 10, of lead or other X-ray proof material, is placed within the dark chamber 7 and covers the sides and bottom thereof with the exception of a space into which is placed an X-ray proof window 11. The X-ray proof window 11 may be of lead glass or any other suitable material permitting vision therethrough, but protection from X-rays. The purpose of the window 11 will hereinafter appear.

Suitably positioned within the dark chamber 7 is a reflecting mirror 12 maintained in a sloping position by means of brackets 13 and 13′ secured to the bottom and top of the dark chamber 7. The top of the dark chamber 7 is adapted to receive a fluorescent screen indicated generally by the numeral 14. The fluorescent screen comprises two layers of plain glass 15 having placed therebetween a suitable fluorescent material 16. This material may be of the type that is readily affected by X-rays, and I have found that platinum barium cyanide, which when affected by X-rays becomes green, is quite satisfactory. It is to be clearly understood, however, that other fluorescent material, such as calcium tungstate, which becomes purple when affected, might also be used.

The fluorescent screen is shown as having two layers of plain glass with the fluorescent material therebetween. Any suitable type of fluorescent screen may be employed without departing from the scope of the invention.

Suitably attached to the dark chamber 7 is a bracket 17 formed with a cylindrical seat member 18. The cylindrical member 18 is adapted to receive an upright rod 19 having a projection which engages a slot 20 formed in the cylindrical seat 18. Twisting of the rod 19 maintains it in position and prevents vertical movement thereof.

Figure 2:
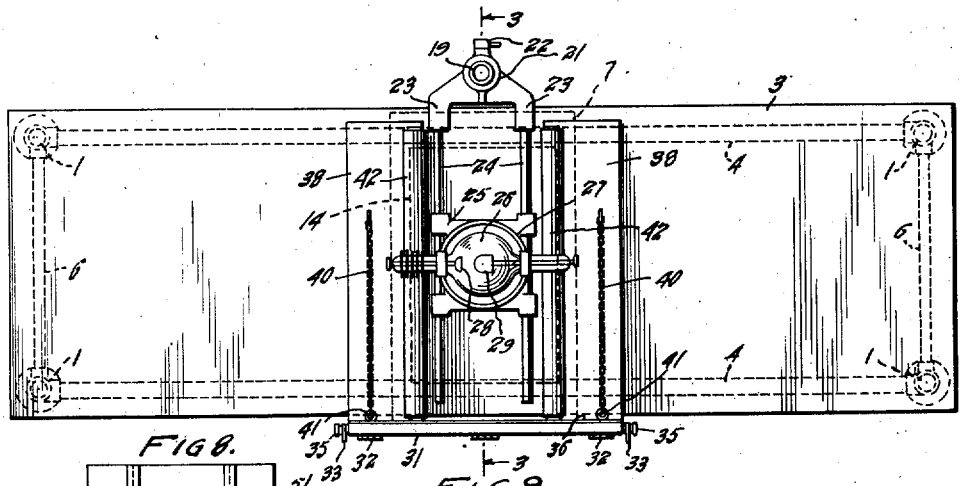
Figure 2 is a plan view of the device.

A guide channel 21 is slidably mounted on the rod 19 and is provided with a screw 22 adapted to lock the bracket in any desired vertical position. The bracket 21 is formed with extending arms 23 having secured thereto rods 24. The rods 24, as is clearly shown in Figure 2, extend transversely of the table top 3. Adapted to slide on the rods 24 is a carriage 25 carrying an X-ray bulb 26 enclosed by a suitable casing 27. The casing 27 is open so that X-rays emanating from the bulb may readily pass to the subject being treated. As is shown in Figure 2, the X-ray bulb is of conventional structure and comprises a cathode 28 and an anode 29 within the bulb 27. The leads connecting the bulb to the source of high voltage may be connected to the ends of the bulb 27 in any well-known manner.

As will be clearly seen from the above, the X-ray apparatus and the dark chamber are adapted to travel in unison by means of the connection between the two. The X-ray carriage may also be moved transversely of the table on the rods 24 to any desired position.

The end of the dark chamber 7 having the X-ray proof window 11 therein extends beyond each side thereof, as indicated by 30 in Figure 1. A panel 31 is hinged to this end of the dark chamber by means of hinges 32. There is also provided a locking arrangement for maintaining the panel 31 in an upright position. As shown, an arm 33 having a notch 34 is pivotally secured to the extended end of the dark chamber. When the panel is in an upright position, the arm 33 is adapted to engage a knob 35 by means of the notch 34, thereby maintaining the panel 31 in an upright position.

Figure 3:
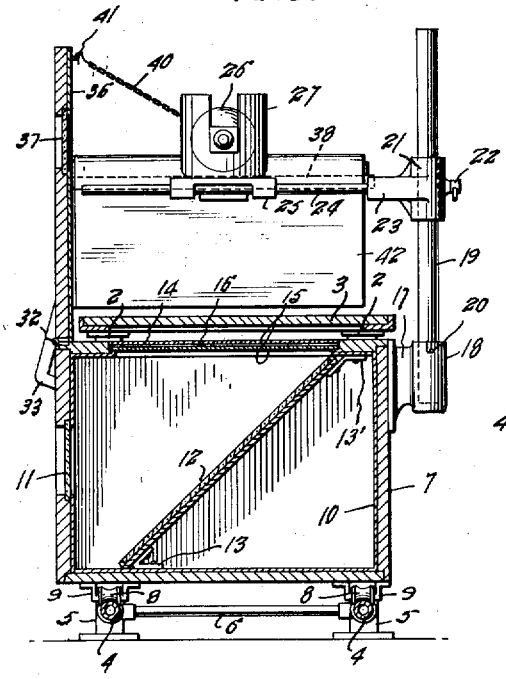
Figure 3 is a view taken along line 3—3 of Figure 2.
Figure 4:
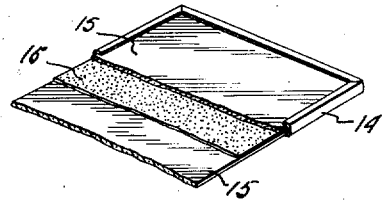
Figure 4 is a perspective view of the fluorescent screen employed by this invention.

As is clearly shown in Figure 3, the panel 31 is covered on its side adjacent the X-ray apparatus by any suitable X-ray proof material 36, such as lead. The X-ray proof material covering one side of the panel 31 protects the operator of the apparatus from the effects of the X-rays.

Positioned within the panel 31 is an X-ray proof window 37 similar to the window 11 in the dark chamber. This window permits the operator to clearly view the X-ray apparatus to determine whether it is functioning properly and to also view the patient who is on the table undergoing treatment. Evenly spaced from the center of the panel 31 and carried thereby are supports 38. The supports, as is shown in Figure 1, form a space therebetween sufficiently wide for the lower part of the carriage carrying the X-ray bulb and its associated conventional structure to freely move transversely of the table top. The supports 38 may also be covered with X-ray proof material, as at times it may be necessary to raise the X-ray structure above the supports, thereby subjecting them to the produced rays.

The supports may be suitably hinged to the panel 31 by means of hinges 39. A chain 40, attached to each support 38, is adapted to be secured to each side of the panel 31 by means of a hook 41 suitably attached thereto. As shown, when the chain engages the hook 41, the arms 38 are maintained in a horizontal position. Secured to each arm 38 on the top thereof is a roller 42 adapted to receive a curtain 43. The curtain 43 is also X-ray proof for reasons that will presently appear.

An opening 44 below each support 38 is provided in the panel 31. The openings 44 are of sufficient size to permit a hand to pass through each in order to change the position of the curtains when in an extended position, for reasons hereinafter appearing.

The operation of the device will now be readily understood. With a patient on the top 3 of the table, the device is moved so that the X-ray bulb is directly above that part of the patient's body which it is desired to subject to the action of the fluoroscopical device. The operator will then adjust the curtains 43, which are in an extended position by means of his hands extending through the openings, so as to regulate the area of the patient's body that it is desired to subject to the X-rays. The device can then be energized. Immediately after the X-rays have started emanating from the bulb, there is produced on the fluorescent screen 14 an image which is reflected by the mirror 12 within the dark chamber. This image may be readily viewed by the operator by merely looking through the X-ray proof window 11 in the dark chamber, or if desired may be viewed by a second person entirely.

Figure 5:
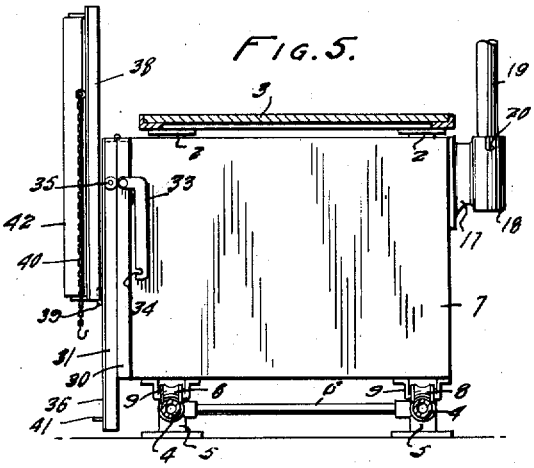
Figure 5 is a side view of the dark chamber showing the panel in a dropped position.

When the apparatus is not in use, the panel 31 may be removed from its extended position and occupy a position shown in Figure 5. This is accomplished by unhooking the chain 40, which allows the supports 38 to drop downwardly. The arm 33 may then be disengaged from the knob 35, thereby permitting the entire panel to be folded backwardly to the position shown.

If it is desired to remove the dark chamber and its associated parts from the table for any reason, the rod 19 can be taken from its cylindrical seat and the entire structure raised from the tracks. By this arrangement, it is possible to use the dark chamber and its associated structure with any table or X-ray apparatus. The structure is therefore, adapted to be used with mostly any X-ray installation without the heretofore necessity of placing the room in total darkness.

Figure 6:
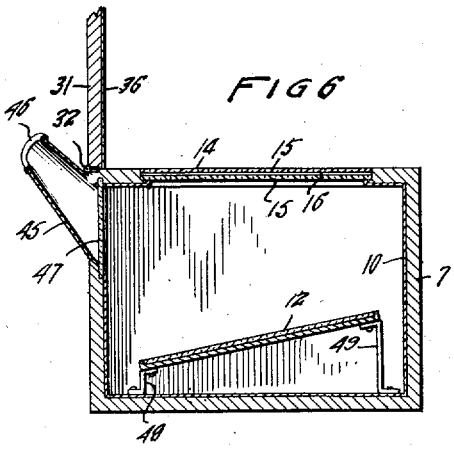
Figure 6 is a sectional view of the dark chamber showing a modified form of means for viewing the image.

In Figure 6 there is shown a modified form of means to permit vision of the image reflected on the mirror 12. As illustrated, a hood 45 extends from the end of the dark chamber and is provided with an eye rest 46. The hood 45 acts as a shield to the light and further allows the operator to more easily view the image.

As in the structure above described, there is also provided an X-ray proof window 47 which is surrounded by the end of the hood attached to the dark chamber which prevents the X-rays from affecting the eyes of the operator. With this type of viewing means, the mirror 12 need not be slanted to the extent shown in Figure 3, but may have more of a horizontal position as shown. The mirror 12 in this modification is suitably supported by means of supports 48 and 49 secured to the bottom of the dark chamber.

Figure 7:
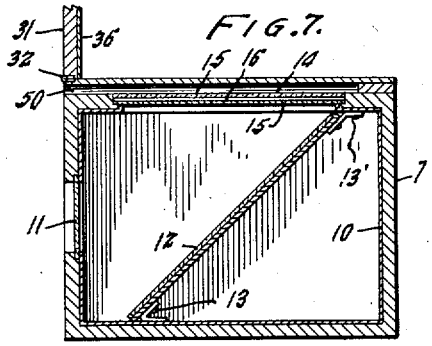
Figure 7 is a sectional view of a slightly modified form of dark chamber adapted to receive a film for producing a permanent record.

Figure 7 shows a modified form of dark chamber which is adapted to receive a photographic film within a space 50 provided between the top of the dark chamber and the fluorescent screen 14. By this arrangement, it is possible not only to obtain a temporary visual image, but also a permanent record of the image, if such is desired.

While I have shown and described the mirror within the dark chamber as being in certain positions, it is to be clearly understood that this invention is not limited to any specific positioning thereof. Furthermore, the means shown for viewing the image are only illustrative and other means might be used. For example, a periscope arrangement may be provided and extended to a point where the operator might view the image without changing his position.

Figure 8:
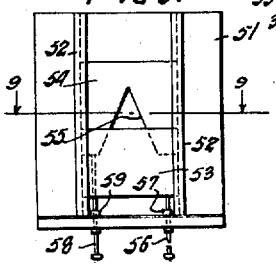
Figure 8 is a plan view of a form of shutter for regulating the area to be affected by X-rays.
Figure 9:
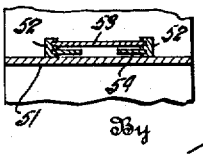
Figure 9 is a view taken along line 9—9 of Figure 8.

Figure 8 shows a somewhat modified form of shutter arrangement for regulating the area to be affected by the X-rays. As shown, the shutter arrangement comprises a board 51 suitably attached to the middle of the insulated panel 31 above the table top 3. Positioned on the board 51 are end channel pieces 52 adapted to receive X-ray proof members 53 and 54 forming the shutter. The member 54 is provided with a cut-out portion 55 which, when exposed to the X-rays, will permit them to pass unobstructed. A rod 56 is attached to the member 53 and passes through a bushing 57 in the panel 31. A similar rod 58 extending through a bushing 59 is connected to the member 54.

The operation of this modification will be apparent. When it is desired to change the size of the opening, the rods 56 and 58 are moved, thereby changing the position of the members 53 and 54. If desired, only one of the members forming the shutter may be moved, thereby exposing a portion of the opening 55.

When using the shutter arrangement just described, the X-ray proof curtains 43 are dispensed with and the operator may use insulated gloves when it is necessary to place his hands in the area affected by the X-rays.

The reason for protecting the hands of the operator from the X-rays is that continuous exposure to the X-rays produces burns and skin infections which may prove quite dangerous. While this is not the case when any part of a person's body is subjected to the X-rays for a comparatively short period, yet continuous exposure, as in the case of an operator using the device daily, may prove dangerous.

From the foregoing, it is apparent that I have provided a fluoroscopical device adapted to be used in a well lighted room. There is also provided by this invention a device of this character which may be moved to any desired position so as to subject any part of a person's body to its action.

There is further provided by this invention a fluoroscopical device which completely protects the operator from any adverse effects produced by the continuous subjecting of his hands or other parts of the body to the X-rays.

The fluoroscopical device has been shown and described as being in a horizontal position. It is to be clearly understood that it might also be used in an upright or an angular position. Suitable locking means could be provided to maintain the dark chamber and associated structure in any position. Also, it is within the scope of my invention to place the X-ray bulb beneath the table with the dark chamber above the table.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A fluoroscopical device comprising a dark chamber, means to produce X-rays spaced from said dark chamber, a panel extending from said dark chamber, means associated with said panel to regulate the area covered by said rays, means affected by the X-rays to produce an image, and means for the reflection and observation of such image.

2. A fluoroscopical device comprising a dark chamber, means to produce X-rays spaced from said dark chamber, a panel extending from said dark chamber, arms extending from said panel, lead curtains mounted on the arms to regulate the area covered by said rays, means affected by the X-rays to produce an image, and means permitting reflection and vision of such image.

3. In a fluoroscopical device comprising a dark chamber, means to produce X-rays spaced from said dark chamber, a panel extending from said dark chamber, arms extending from said panel, lead curtains mounted on rollers fixed on the arms to regulate the area covered by said rays, means affected by the X-rays to produce an image and means within said dark chamber to reflect and observe the image.

4. In a fluoroscopical device comprising a dark chamber, means to produce X-rays spaced from said dark chamber, a panel extending from said dark chamber, means associated with said panel to regulate the area covered by said rays, an X-ray proof window in said panel, means affected by X-rays to produce an image, and means to reflect and observe the image.

5. In a fluoroscopical device comprising a dark chamber, means to produce X-rays spaced from said dark chamber, a panel extending from said dark chamber, means associated with said panel to regulate the area covered by said rays, an X-ray proof window in said panel, openings in said panel to permit movement of the regulating means with protection from X-rays, and means affected by said X-rays to produce, reflect and observe an image.

6. In a fluoroscopical device comprising a dark chamber, means to produce X-rays positioned above said dark chamber, a panel extending from said dark chamber, means associated with said panel to regulate the area covered by said rays, an X-ray proof window in said panel, openings in said panel to permit movement of the regulating means, means affected by said X-rays to produce an image, means within the dark chamber to reflect said image, and means to permit vision of such reflected image.

7. In combination with a surgical table an X-ray apparatus, comprising an X-ray tube above the table, a fluorescent screen below the table upon which the shadow is to be cast by an object placed between said tube and said screen, a dark chamber provided with an entrance opening directed toward said screen and provided also with a viewing opening, an image reflecting surface within said chamber to reflect the shadow image toward said viewing opening, and X-ray proof means to protect a person looking into said viewing opening, said means comprising an X-ray proof shield between said tube and one face of said screen, and an X-ray proof shield beyond the opposite face of said screen toward said reflecting surface.

FRANCIS E. TALTY.